US007660999B2

(12) United States Patent
Kudallur et al.

(10) Patent No.: US 7,660,999 B2
(45) Date of Patent: Feb. 9, 2010

(54) MIME HANDLING SECURITY ENFORCEMENT

(75) Inventors: Venkatraman V. Kudallur, Redmond, WA (US); Shankar Ganesh, Bellevue, WA (US); Roberto A. Franco, Seattle, WA (US); Vishu Gupta, Redmond, WA (US); John G. Bedworth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 10/873,576

(22) Filed: Jun. 22, 2004

(65) Prior Publication Data

US 2006/0010241 A1   Jan. 12, 2006

(51) Int. Cl.
*G06F 12/14* (2006.01)
*G06F 12/16* (2006.01)
*G06F 15/16* (2006.01)

(52) U.S. Cl. .................... 713/189; 709/246; 713/187; 713/188; 726/22

(58) Field of Classification Search ............... None
See application file for complete search history.

(56) References Cited

U.S. PATENT DOCUMENTS 5,911,776 A * 6/1999 Guck ..................... 709/217

| 6,901,519 | B1 * | 5/2005 | Stewart et al. ............... 726/24 |
| 7,228,307 | B2 * | 6/2007 | Dettinger et al. ............ 707/100 |
| 7,263,561 | B1 * | 8/2007 | Green et al. ................ 709/246 |
| 2001/0056444 | A1 * | 12/2001 | Ide et al. ..................... 707/513 |

OTHER PUBLICATIONS

T. Harding et al.; "*MIME-based Secure Peer-to-Peer Business Data Interchange over the Internet*"; Sep. 2002; pp. 1-29.
Chenxi Wang et al.; "*On Computer Viral Infection and the Effect of Immunization*"; 11 pgs.
John W. Lockwood et al.; "*Internet Worm and Virus Protection in Dynamically Reconfigurable Hardware*"; Washington DC, 2003, Paper E10, Sep. 9-11, 2003; pp. 1-8.

* cited by examiner

*Primary Examiner*—Nasser G Moazzami
*Assistant Examiner*—Fatoumata Traore

(57) ABSTRACT

A model restricts un-trusted data/objects from running on a user's machine without permission. The data is received by a protocol layer that reports a MIME type associated with the DATA, and caches the data and related cache file name (CFN). A MIME sniffer is arranged to identify a sniffed MIME type based on the cached data, the CFN, and the reported MIME type. Reconciliation logic evaluates the sniffed MIME type and the CFN to determine a reconciled MIME type, and to update the CFN. A class ID sniffer evaluates the updated CFN, the cached data, and the reconciled MIME type to determine an appropriate class ID. Security logic evaluates the updated CFN, the reported class ID, and other related system parameters to build a security matrix. Parameters from the security matrix are used to intercept data/objects before an un-trusted data/object can create a security breach on the machine.

21 Claims, 6 Drawing Sheets

| DC | CFE | Doc Host | Registered Types | | UI Definitions | | |
|---|---|---|---|---|---|---|---|
| | | | Class ID Type | CFE Type | Open Save | Danger Level | Persist |
| D1 | WAV | Y | T1 | T1 | Y | 1 | Y |
| D2 | MP3 | Y | T1 | T1 | Y | 1 | Y |
| D3 | JPG | N | T5 | T9 | Y | 3 | Y |
| - | EXE | N | T5 | T5 | Y | 9 | N |
| ⋮ | ⋮ | ⋮ | ⋮ | ⋮ | ⋮ | ⋮ | ⋮ |
| - | ARC | N | - | - | Y | 9 | N |

FIG. 4B

MIME HANDLING SECURITY ENFORCEMENT

FIELD OF THE INVENTION

A system and method is described that restricts access for downloading, saving, and executing data based on a security enforcement model. The security enforcement model evaluates information related to the data such as (some or all of): the multipurpose internet mail exchange (MIME) type, any class identifiers, the cache-file extension, and the data itself. Inconsistencies in the evaluated information are reviewed to asses risk associated with allowing the user to access the data. Actions related to the data can be allowed or disallowed once the risk has been assessed, where the user can optionally be prompted for each action by an appropriate user interface (UI) trap.

BACKGROUND OF THE INVENTION

The hypertext markup language (or HTML) is commonly used to define the structure for presenting content in a webpage. Web pages that are prepared using HTML can be viewed with a variety of web browser application programs. In addition, HTML web pages can be viewed on different computing systems that may otherwise be incompatible with one another. As such, HTML has been adopted throughout the computing community as a common platform for web page development to provide transportability of content between computing systems.

HTML employs a set of standard codes or "markup tags" that are used to define the format (e.g., text color, font size, etc.) and location associated with text, images, and other content. In general, a web browser builds a web page by retrieving the text file associated with the web page and interpreting the markup tags in the text file to format the web page for viewing. An example web page typically includes text, graphic images, and links to other web pages. Graphics images and remote executable programs such as binary executables are downloaded onto the local machine so that the web page can be built appropriately.

Typical web browsers will prompt a user for a decision on installing executable programs that are necessary for the display of content associated with a web page. Example executables include plug-ins, active-x controls, as well as others. In some instances, the web browser does not prompt the user for a decision based on MIME type information that is being reported to the browser. For example, a .JPG file is a graphics image that may be associated with an HTTP request. In this example, the web browser will simply display the image without requiring user interaction.

SUMMARY OF THE INVENTION

Briefly stated, a model is described that restricts un-trusted data/objects from running on a user's machine without permission. The data is received by a protocol layer that reports a MIME type associated with the DATA, and caches the data and related cache file name (CFN). A MIME sniffer is arranged to identify a sniffed MIME type based on the downloaded data, the CFN, and the reported MIME type. Reconciliation logic evaluates the sniffed MIME type and the CFN to determine a reconciled MIME type, and to update the CFN. A class ID sniffer evaluates the updated CFN, the cached data, and the reconciled MIME type to determine an appropriate class ID. Security logic evaluates the updated CFN, the reported class ID, and other related system parameters to build a security matrix. Parameters from the security matrix are used to intercept data/objects before an un-trusted data/object can create a security breach on the machine.

A more complete appreciation of the present invention and its improvements can be obtained by reference to the accompanying drawings, which are briefly summarized below, and to the following detailed description of illustrative embodiments of the invention, and to the appended claims.

BRIEF DESCRIPTION OF THE DRAWINGS

Non-limiting and non-exhaustive embodiments of the present invention are described with reference to the following drawings.

FIG. 4B is an illustration of an example security matrix in tabular form; and

DETAILED DESCRIPTION OF THE PREFERRED EMBODIMENT

Figure 1:
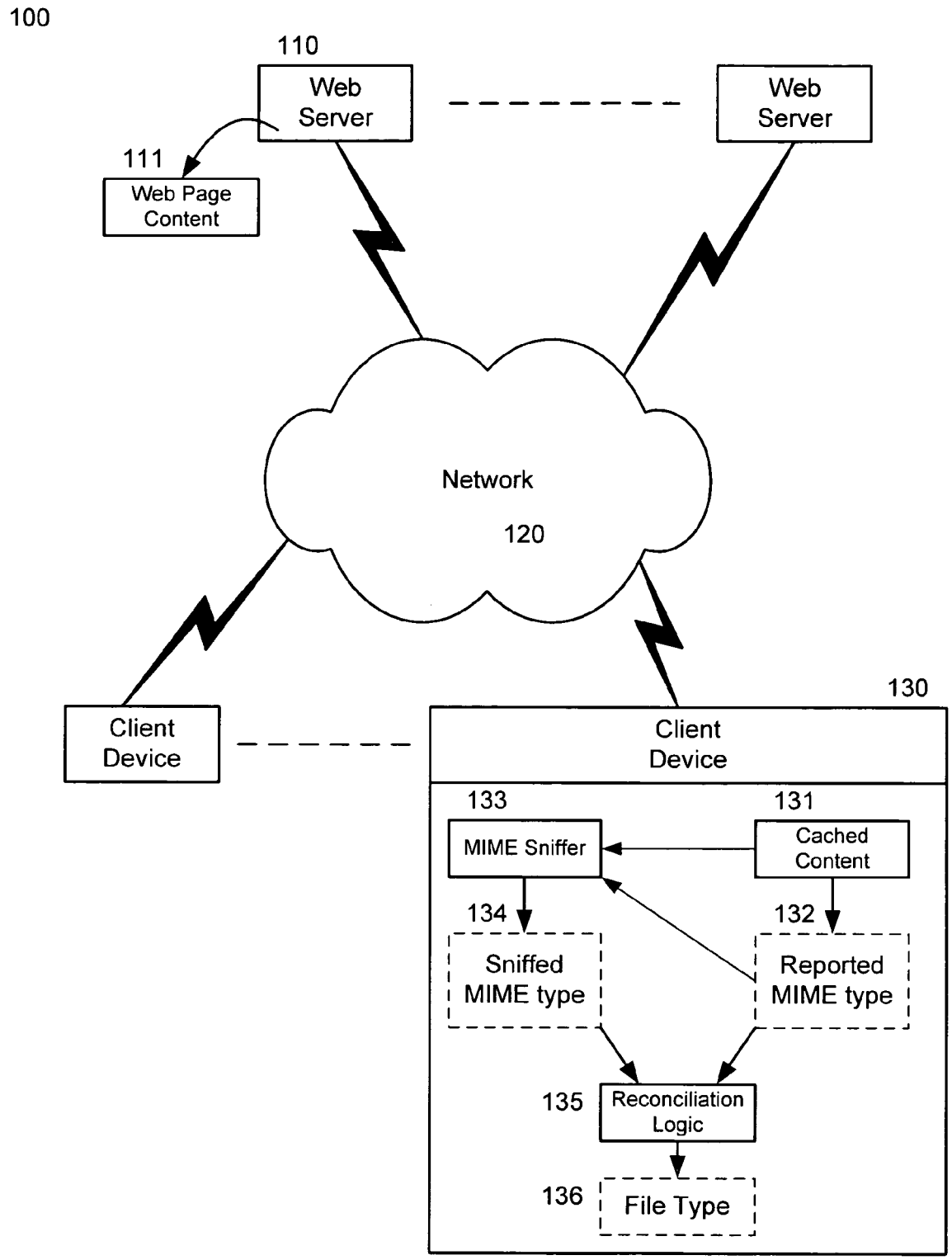
FIG. 1 is a diagram illustrating an example operating environment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Security is an important issue to consider when implementing web browsers and other similar technologies. Problematic security risks exist such as computer viruses, Trojan horse programs, computer worms, and email replicators to name a few. Improved security for email and web browsers is desirable to prevent destruction/corruption of data, as well as preventing identity theft.

In an effort to prevent unauthorized access to computer systems various protection mechanisms have been developed such as firewall programs, anti-virus programs, and anti-spyware programs. Traditional security models have also been implemented to limit the execution and/or installation of software based on user permission levels.

A security enforcement model is described that uses multipurpose internet mail exchange (MIME) type information. Security restrictions are imposed on downloading and executing a file based on an authentication of its reported MIME type. The reported MIME type is evaluated to identify inconsistent, corrupt, or otherwise un-trusted data. Data with a reported MIME type that is un-trusted is given a revised file extension that corresponds to a reduced security exposure such that a dangerous security risk is averted.

Example Operating Environment

An example operating environment for the present invention is illustrated in FIG. 1. As show in the figure, one or more web server devices (110) can communicate content (111)

over a network (120), where the content includes or references at least one executable behavior. One or more client devices (130) can receive the content (111) from the network (120) and create a locally cached copy (131) of the content. The locally cached content (131) is processed on the client device (130) and parsed through a security manager before executable behaviors are permitted.

The example operating environment is described in the context of client and server computing devices that communicate content (e.g., web pages) over a communication medium such as an internet, intranet, or some other network connection topology. The terms "client" and "server" refer to one instance of the method. However, the same device may play both a "client" and a "server" role in different instances. Generally speaking, any machine can be arranged to enforce the security model that is described herein.

Content that is provided to the machine may contain an executable that may pose an undesirable security risk. Before allowing the download, storage, and/or execution of questionable data (content), a security manager on the local machine (client 130) applies a series of security metrics to verify the data's integrity. The content (data) is initially cached by a protocol layer in the client device. A MIME sniffer (133) is arranged to evaluate the cached content, the file name associated with the cached content, and a reported MIME type (132) to identify a sniffed MIME type (134). Reconciliation logic (135) compares the reported MIME type (132) and the sniffed MIME type (134) to identify inconsistencies. The file name (or file type) can be updated based on any identified inconsistencies. The security model employed by the machine (client 130) can be utilized to verify executable file types (both shell execute and hosted executables) and to prevent undesirable files from accessing the machine.

Example Computing Device

Figure 2:
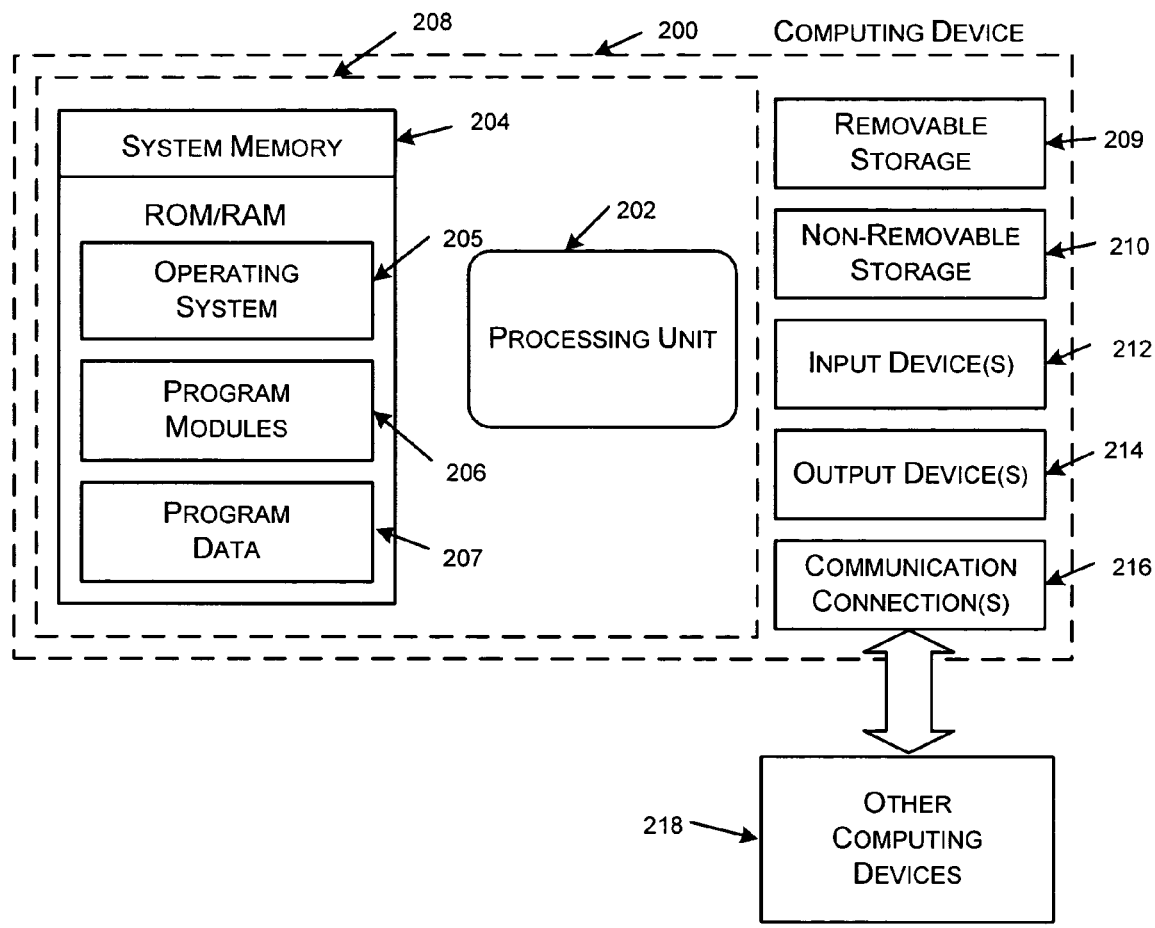
FIG. 2 is a diagram illustrating an example computing device.

FIG. 2 is a block diagram of an example computing device that is arranged in accordance with the present invention. In a basic configuration, computing device 200 typically includes at least one processing unit (202) and system memory (204). Depending on the exact configuration and type of computing device, system memory 204 may be volatile (such as RAM), non-volatile (such as ROM, flash memory, etc.) or some combination of the two. System memory 204 typically includes an operating system (205); one or more program modules (206); and may include program data (207). This basic configuration is illustrated in FIG. 2 by those components within dashed line 208.

Computing device 200 may also have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and non-volatile, removable and non-removable media implemented in any method or technology for storage of information, such as computer readable instructions, data structures, program modules or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included. All these devices are known in the art and need not be discussed at length here.

Computing device 200 also contains communications connection(s) 216 that allow the device to communicate with other computing devices 218, such as over a network. Communications connection(s) 216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Various procedures and interfaces may be implemented in one or more application programs that reside in system memory 204. In one example, the application program includes a MIME security manager in a local computing device (e.g., a client device) that is arranged to apply security restrictions to limit access to the machine for downloading files, opening files, executing programs, or otherwise compromising security of the machine. Example application programs that may employ a MIME security manager in memory 204 include: a web browser application, an email manager application, a contact manager application, a calendar manager application, a word processing application, a spreadsheet application, as well as others.

MIME Security System

Figure 3:
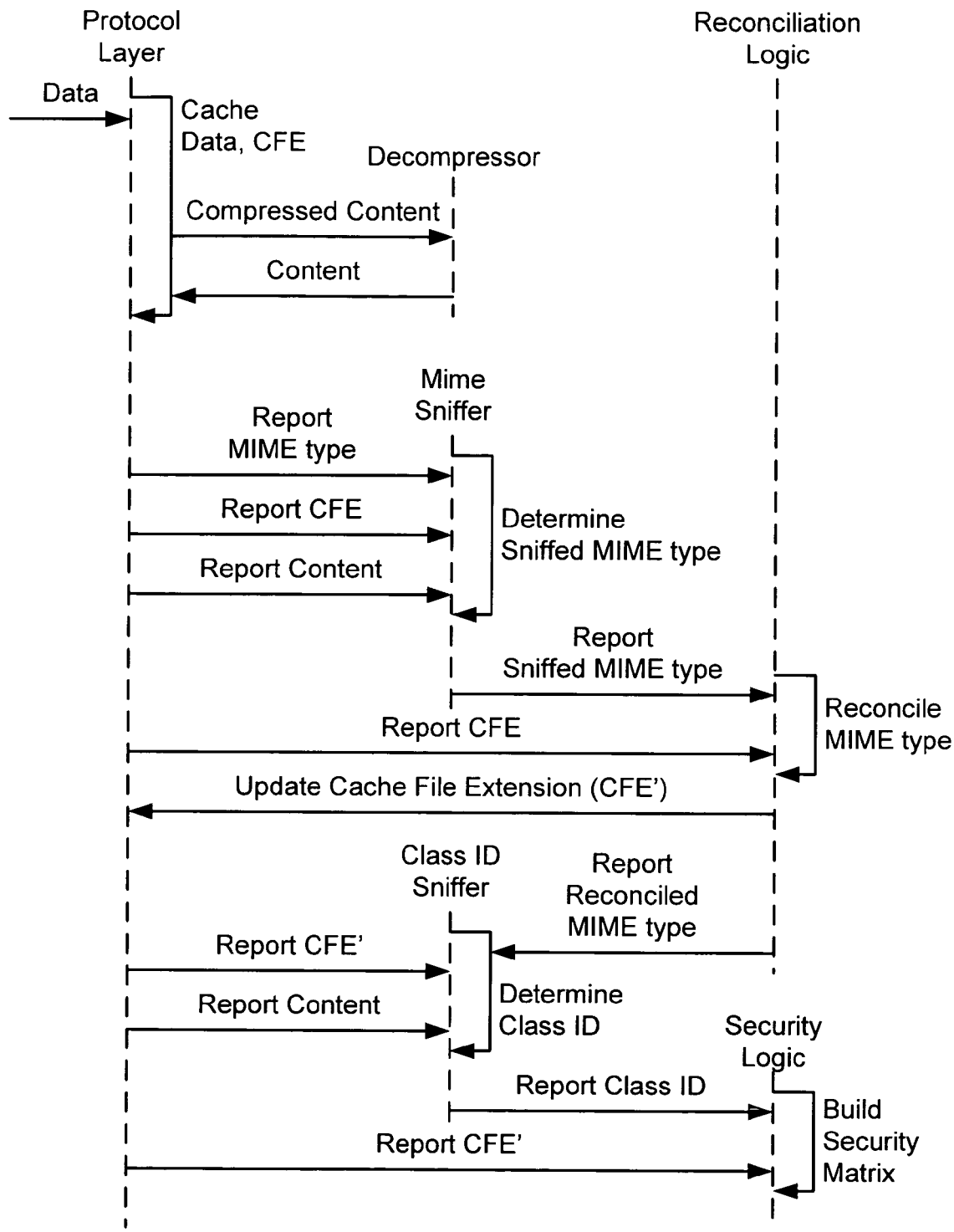
FIG. 3 is an illustration of an example security model.

Each device or machine is arranged to operate with an application program that includes a security manager. The security manager can be a single application program, or a set of modular programs that are arranged to cooperate with one another. FIG. 3 is an illustration of an example security model that applies security metrics to prevent un-trusted data/objects from creating security breaches on a machine. The example illustrated in FIG. 3 includes modules for: a protocol layer, a MIME sniffer, reconciliation logic, a class ID sniffer, and a security logic. The illustrated modules are functional partitions that can be implemented as separated program modules, combined into a single program module, or partitioned in a completely different manner.

Example protocol layers that can be employed include an HTTP protocol layer, a TCP/IP protocol layer, an FTP protocol layer, and a WAP protocol layer, to name a few. In one example, data (or an object) is received by the protocol layer and cached as data with a specified filename. For this example, the cache filename (CFN) associated with the cached data has an associated file type, which typically is identified with a particular cache file extension (CFE). An example file extension is a "exe" file extension that is typically associated with a binary executable.

When necessary, an optional decompressor can be employed to decompress any compressed data (content) such as data that is encrypted or archived (ARC, ZIP, etc). The protocol layer extracts a MIME type out of the received data and reports it to a MIME sniffer, along with the content (the data) and the cache file type (CFE). In one example, the protocol layer is an HTTP protocol layer and the MIME file type is extracted out of an HTTP tag.

The MIME sniffer is arranged to evaluate the data, the cache file type, and the reported MIME type to identify inconsistencies. When all of the sources (the reported MIME type, the cache file type, or the actual data) agree with one another, the reported MIME type and the sniffed MIME type are identical. However, the sniffed MIME type can be different from the reported MIME type when inconsistencies are found. For example, a reported MIME type that is tested as binary executable yields a sniffed MIME type of "executable" instead of "text".

The reconciliation logic receives the sniffed MIME type and the reported cache file type (e.g., CFE). The reported CFE is optionally replaced with an updated cache file extension (CFE') to minimize security risk when a reported MIME type does not match the sniffed MIME type and the CFE. The changed cache file type (through changing the cache file extension) can be used to prevent the execution of un-trusted data.

A class ID sniffer receives the content, the updated cache file type, and the reconciled MIME type, and is arranged to determine an appropriate class identifier (Class ID). The class ID and the updated cache file type is used by the security logic to build a security matrix that can be used in further processing the data.

The cache file is not necessarily created in every instance. When the cache file does not exist, the data may be directly evaluated by each relevant system component as required. For example, the MIME sniffer may evaluate the data (or buffered data) without consideration of the reported CFE since the cache file is non-existent. Similarly, the reconciliation logic may evaluate the data (or buffered data) to determine if the data conforms with the reported sniffed MIME type without considering the reported CFE. Also, the class ID sniffer may compare the reported reconciled MIME type to the data without consideration of the CFE. The absence of a cache file does not impact the creation or application of the security matrix. A null entry can be created in the security matrix for the CFE when a cache file is not created.

Example Security Matrix

Figure 4A:
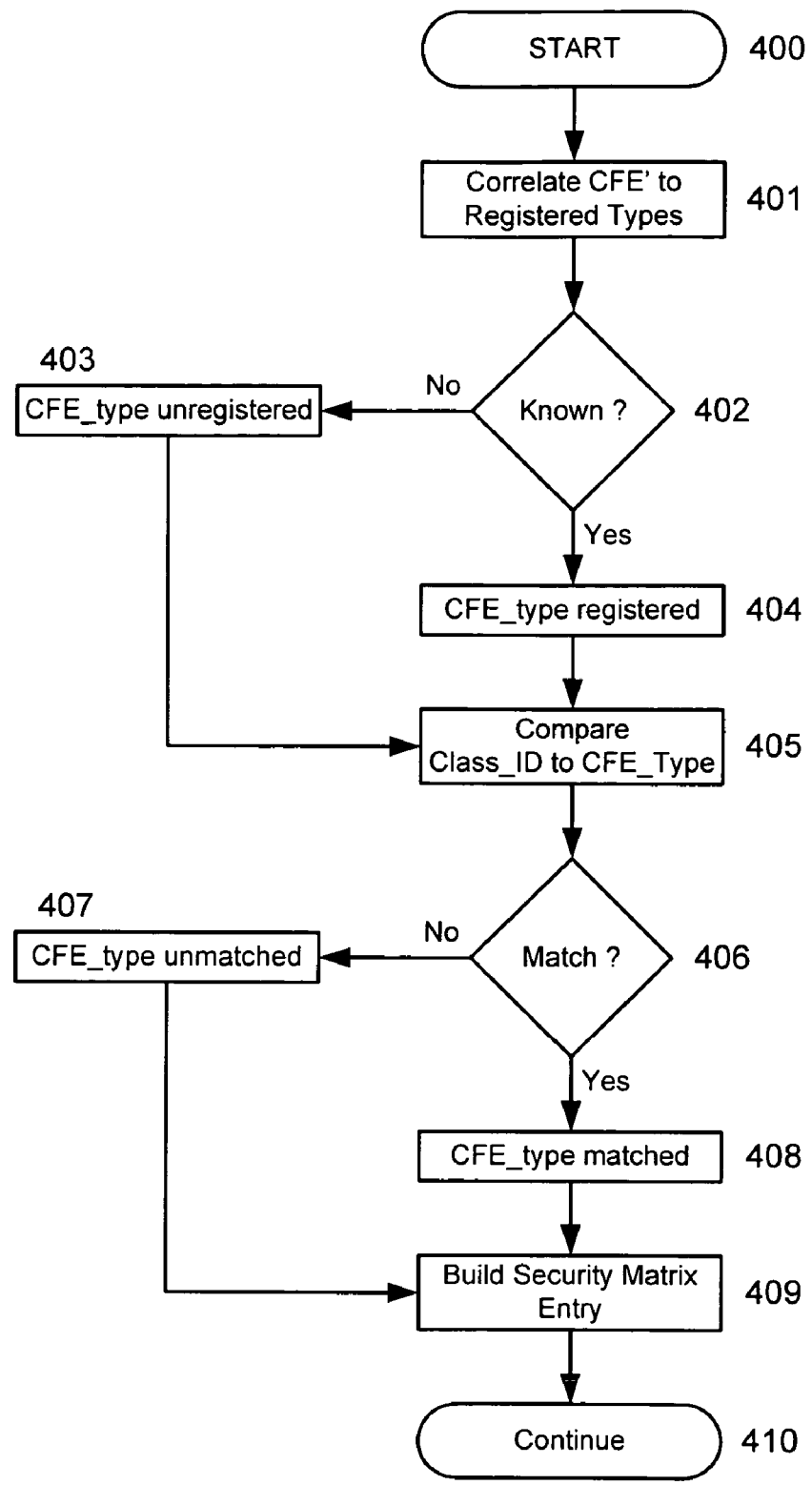
FIG. 4A is a diagram illustrating an example process flow for building a security matrix.

FIG. 4A is a diagram illustrating an example process flow for building a security matrix such as that shown in FIG. 4B. Processing begins at block 400 and continues to block 401.

At block 401, the updated cache file extension (or cache file type) is correlated with registered types on the machine. In one example, a registration procedure is employed by each application program on the machine such that every file type associated with that application program has a corresponding registered file type. The file types that are registered with the various application programs are compared to the cache file extension (or cache file type).

Processing continues from block 401 to decision block 402. At decision block 402, the machine evaluates whether or not the cache file extension (CFE') is matched to a known file extension. Processing flows from decision block 402 to block 403 when a known file extension is not found (CFE_type unregistered). Alternatively, processing flows from decision block 402 to block 404 when a known file extension is found (CFE_type registered).

Processing continues from blocks 403 and 404 to block 405. At block 405, the sniffed class ID is compared to the CFE_type that was identified based on the file extension. At decision block 406, the machine evaluates whether or not the cache file extension (CFE') is matched to a sniffed class ID. Processing flows from decision block 406 to block 407 when the CFE type matches the sniffed class ID (CFE_type matched). Alternatively, processing flows from decision block 406 to block 408 when the CFE type matches the sniffed class ID (CFE_type matched).

As described previously, the cache file may not created in each and every instance. Whenever the cache file is not created, the correlation of registered types and the related matching procedures described in FIG. 4A by blocks 400-410 are determined by evaluating the data instead of the cache file types (CFE, CFE', etc.)

The above described determinations are arranged in a matrix as illustrated in FIG. 4B. For the example security matrix of FIG. 4B: the first column indicates a doc-host class ID (DC), the second column indicates the cache file extension (CFE), the third column indicates the status for doc hosting (Doc Host), the fourth and fifth columns indicate the registered types associated with the corresponding doc-host class ID (DC) and/or cache file extension (CFE), and the sixth, seventh, and eighth columns are related to an optional set of user interfaces.

Each designated class identifier may correspond to an executable file type, or some other file type. In one example, the class identifier associated with the data or object corresponds to a data type that should be hosted within a browser window (referred to as "dochost"). For this example, the "Doc Host" column of the security matrix has a "Y" entry to indicate that "YES" the designated type should be hosted in a window. In another example, the class identifier associated with the data or object corresponds to a data type that should be directed to an executable shell outside of the current browser window (referred to as "shell execute"). For this example, the "Doc Host" column of the security matrix has an "N" entry to indicate that "NO" the designated type should not be hosted in a window and should instead by directed to a separately executable shell.

The registered types for the identified class ID (DC) and the cache file extension (CFE) may not match as illustrated by the fourth and fifth columns. For example, the class ID type and the CFE type are matched as designated by T1 for the class IDs identified as D1 and D2. However, the class ID type does not match the CFE type (i.e., T5 vs. T9) for the class ID identified by D3. This situation may occur when a CFE has two different registered types, or when a type is improperly registered.

An optional set of user interface (UI) definitions can be mapped to the security level assessment based on the DC, CFE, and registration types. In one example, the UI definitions include a field to indicate whether an open/save dialog box should appear. In another example, the UI definitions include a field to indicate a danger level associated with the data. In still another example, the UI definitions include a field to indicate whether or not the user's selections for the given DC/CFE/types should have persistence or not. Additional UI/security definitions can be employed without departing from the spirit of the invention.

Example Security Logic

Figure 5:
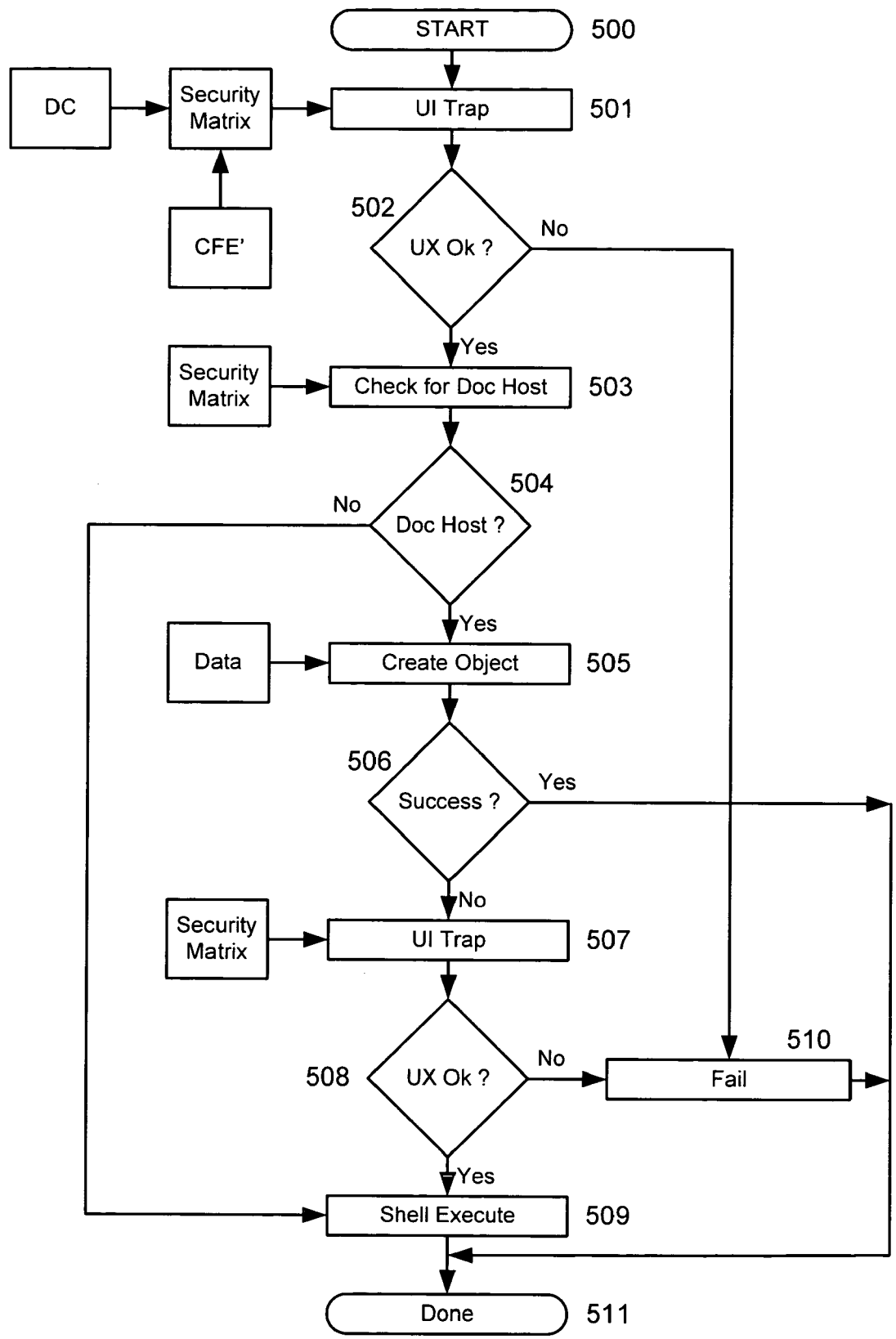
FIG. 5 is a diagram illustrating an example process flow for a security logic that utilizes a security matrix, arranged according to at least one aspect of the present invention.

FIG. 5 is a diagram illustrating an example process flow for a security logic that utilizes a security matrix. Processing begins at block 500.

An optional user interface trap (UI Trap) is illustrated by block 501, where the UI can prompt the user based on the dochost class ID (DC) and the updated cache file extension (CFE'). The prompts provided to the user through the UI can be a dynamically configured such as that described by a security matrix (e.g., FIG. 4B). After the user responds to the request (e.g., selecting save, open, or cancel), processing continues to decision block 502. Based on the user experience (UX), the process either continues to block 503 or fails at block 510.

Continuing to block 503, the security matrix is referenced to determine whether or not doc-hosting should be employed. In one example, the security matrix is evaluated based on the doc-host class ID (DC). In another example, the security matrix is evaluated based on the cache file extension (CFE). In still another example, the security matrix is evaluated based on the updated cache file extension (CFE').

Processing continues from decision block 504 to block 505 when the security matrix indicates that hosting is required. Alternatively, processing flows from block 504 to block 509 when the security matrix indicates that hosting is not required.

At block 505, an object is created in the browser using data from the cache file (or buffered data that is not from the cache file, when the cache file is unavailable). In some instances, the data from the cache file is insufficient to satisfy the instantiation of the request object and processing flows from decision block 506 to block 507. In another example, the object is successfully created and processing flows from decision block 506 to block 511.

At block 507, another optional UI trap is employed to prompt the user for assistance in determining what action to take for the unsuccessful object creation. The prompts provided to the user are again dynamically configured such as that described by a security matrix (e.g., FIG. 4B). After the user responds to the request (e.g., selecting save, open, or cancel), processing continues to decision block 508. Based on the user experience (UX), the process either continues from decision block 508 to block 509, or fails at block 510.

At block 509, the data from the cache file (or buffered data that is not from the cache file, when the cache file is unavailable) is provided as a shell execute. The shell execute can once again provide an optional UI trap (not shown). After the shell execute is complete, processing is concluded at block 511.

Each of the described UI trap routines is arranged to request user authorization when necessary prior to proceeding. In one example, persistence from a prior user decision is employed such that the dialog box for the UI need not be provided. In another example, the dialog box for the UI provides a detailed warning message based on the danger level. Potential dangers include invalid data, malicious data, misregistered file types, as well as bad or corrupted information that is extracted from the MIME header of an HTTP file. Although the security matrix is described with reference to a UI Definition, the security matrix (or table) can be used by various program modules that are unrelated to a UI.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for enforcing security restrictions on received data, comprising:

identifying, by a computing device, a multipurpose internet mail exchange (MIME) type that is reported by the received data to provide a reported MIME type;

evaluating, by the computing device, the received data to determine a sniffed MIME type;

identifying, by the computing device, inconsistencies between the reported MIME type and the sniffed MIME type;

reconciling, by the computing device, the reported MIME type with the sniffed MIME type to provide an updated cache file extension, wherein the updated cache file extension is determined responsive to the identified inconsistencies;

determining, by the computing device, a class identifier that is associated with the updated cache file extension and the received data;

building, by the computing device, a security matrix that is referenced by the class identifier, wherein the security matrix includes at least one of a doc-hosting field for creating an object associated with the received data, and a shell executing field for initiating an executable shell associated with the received data; and storing, by the computing device, the security matrix on a computer readable storage medium associated with the computing device.

2. The computer implemented method of claim 1, wherein the class identifier is associated with at least one or more of: a cache filename, a cache file extension, a registered type, the reported MIME type, the sniffed MIME type, and the an updated cache file extension.

3. The computer implemented method of claim 1, wherein the reported MIME type is associated with at least one or more of: a text file, a binary file, an executable file, an executable object, a word processing file, a spreadsheet file, a message file, a graphic image file, an audio file, a video file, a multi-media file, a multipart file, and an application file.

4. The computer implemented method of claim 1, wherein said evaluating the received data comprises evaluating at least one or more of: the reported MIME type, a filename associated with the received data, a file extension associated with the received data, and content that is associated with the received data.

5. The computer implemented method of claim 1, wherein the received data includes a header and content, and wherein said identifying the MIME type comprises extracting the reported MIME type from the header associated with the received data.

6. The computer implemented method of claim 1, further comprising: creating a cache file with content that is associated with the received data, wherein the cache file has a corresponding filename that is determined by information that is extracted from a header that is associated with the received data.

7. The computer implemented method of claim 1, wherein said evaluating information associated with the received data to provide the sniffed MIME type comprises: evaluating at least one or more of the reported MIME type, a filename associated with a cache file, a cache file extension associated with the cache, and content that is associated with the received data.

8. The computer implemented method of claim 1, wherein said identifying inconsistencies between the reported MIME type and the sniffed MIME type is based on one or more of: the reported MIME type, the sniffed MIME type, a filename associated with a cache file, a cache file extension associated with the cache file, and content that is associated with the received data.

9. The computer implemented method of claim 1, wherein said determining the class identifier that is associated with the updated cache file extension and the received data comprises evaluating one or more of: a cache filename associated with a cache, a cache file extension associated with the cache, content associated with the received data, the reported MIME type, the sniffed MIME type, and the updated cache file extension.

10. The computer implemented method of claim 1, wherein the security matrix includes a field that is referenced by the class identifier, wherein the field is associated with one or more of: a filename associated with the received data, a file extension associated with the received data, a cache filename associated with a cache file, a cache file extension associated with the cache file, a registered type, a registered class ID type, a registered cache file extension type, and a User Interface (UI) definition.

11. The computer implemented method of claim 1, wherein the computer implemented method is one or more of: a web browser application, an electronic mail application, a contact manager application, a calendar manager application, a word processing application, a spreadsheet application, a security manager application, a module for a web browser application, a module for an electronic mail application, a module for a contact manager application, a module for a calendar manager application, a module for a word processing application, a module for a spreadsheet application, and a module for a security manager application.

12. The computer implemented method of claim 1, further comprising at least one or more of: decompressing the received data, decrypting the received data, extracting content from the received data, extracting content from the decompressed data, extracting content from the decrypted data, extracting a header from the received data, extracting the header from the decompressed data, and extracting the header from the decrypted data.

13. A computer readable medium having computer executable instructions for enforcing security restrictions on received data, comprising:
identifying a multipurpose internet mail exchange (MIME) type that is reported by the received data to provide a reported MIME type;
evaluating the received data to determine a sniffed MIME type;
identifying inconsistencies between the reported MIME type and the sniffed MIME type;
reconciling the reported MIME type with the sniffed MIME type to provide a reconciled MIME type, wherein the reconciled MIME type is determined responsive to the identified inconsistencies;
determining an identifier that is associated with the reconciled MIME type and the received data; and
accessing a security matrix that includes a field that is referenced by the identifier associated with the reconciled MIME type, wherein the field is associated with one or more of: a doc-hosting field for creating an object associated with the received data, and a shell executing field for initiating an executable shell associated with the received data.

14. The computer readable medium of claim 13, wherein the identifier is associated with one or more of: a class ID, a cache filename, a cache file extension, a registered type, the reported MIME type, the sniffed MIME type, and the reconciled MIME type.

15. The computer readable medium of claim 13, further comprising: referencing the doc-hosting field of the security matrix in response to the identifier, and instantiating an object associated with the received data when doc-hosting is permitted by the referenced doc-hosting field, wherein instantiation of the object requires downloading additional data.

16. The computer readable medium of claim 13, further comprising: referencing a User Interface (UI) definition field of the security matrix in response to the identifier, and presenting a user interaction based on the referenced UI definition field.

17. The computer readable medium of claim 16, wherein the user interaction comprises one or more of presenting: an open dialog, a save dialog, a cancel dialog, and presenting a security warning message.

18. The computer readable medium of claim 13, further comprising selecting a previously selected user interaction when a persistence field associated with the User Interface (UI) indicates that persistence for a current user interaction is enabled.

19. The computer readable medium of claim 13, further comprising: trapping one or more of instantiating, executing, downloading, saving, opening, hosting, and shell-executing associated with the received data after accessing the field associated with the security matrix with the referenced identifier.

20. A system for enforcing security restrictions on data that is received by a client device, comprising:
a processor;
one or more computer-readable media operably associated with the processor;
computer-readable instruction on the one or more computer-readable media comprising:
means for determining a reported multipurpose internet mail exchange (MIME) type that is reported by the received data;
means for evaluating the received data to identify a sniffed MIME type, wherein the data is evaluated by evaluating one or more of: the reported MIME type, a filename associated with the received data, a file extension associated with the received data, content that is associated with the received data, a cache filename that is associated with the received data, a cache file extension that is associated with the received data, and header information that is associated with the received data;
means for reconciling inconsistencies between the sniffed MIME type and the reported MIME type to determine a reconciled MIME type, wherein the means for reconciling is arranged for comparing the sniffed MIME type to the reported MIME type to determine whether the sniffed MIME type matches the reported MIME type, and wherein the means for reconciling is further arranged for selecting a reconciled MIME type based on the result of the comparison;
means for determining a identifier from one or more of: the reconciled MIME type, the file name associated with the received data, the file extension associated with the received data, the content that is associated with the received data, the cache filename that is associated with received data, and the cache filename extension;
means for accessing a security matrix that includes a field that is referenced by the identifier, wherein the field is associated with one or more of: a doc-hosting field for creating an object associated with the received data, and a shell executing field for initiating an executable shell associated with the received data, and
means for enforcing the security restrictions based on the field that is accessed with reference to the identifier.

21. A computer readable medium having computer-executable instructions for enforcing security restrictions on received data, comprising:

storing the received data in a cache;

identifying a multipurpose internet mail exchange (MIME) type reported by the received data in the cache as a reported MIME type;

evaluating the received data in the cache to determine a sniffed MIME type;

identifying inconsistencies between the reported MIME type and the sniffed MIME type to determine whether the reported MIME type matches the sniffed MIME type;

selecting an updated cache file extension for the received data in the cache in response to identified inconsistencies between the reported MIME type and the sniffed MIME type;

storing the updated cache file extension in association with the received data in the cache;

determining an identifier that is associated with the updated cache file extension and the received data in the cache; and accessing a security matrix that includes a field that is referenced by the identifier, wherein the field is associated with one or more of: a doc-hosting field for creating an object associated with the received data, a shell executing field for initiating an executable shell associated with the received data, an open/save dialog in a User Interface (UI) field, a danger level indicator in the UI field, and a persistence field associated with the UI.

\* \* \* \* \*